Jan. 27, 1942.     G. F. McKAY     2,271,144
FUEL TESTING MEASURING APPARATUS
Filed March 25, 1940
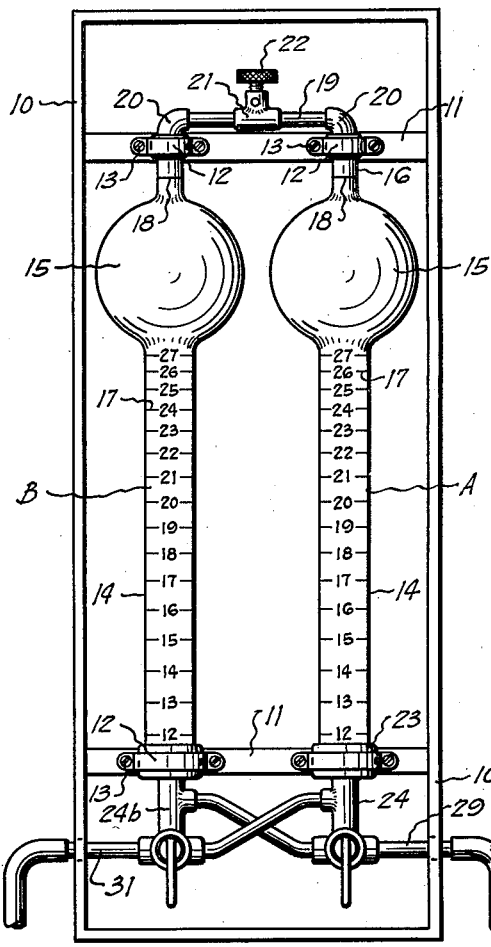
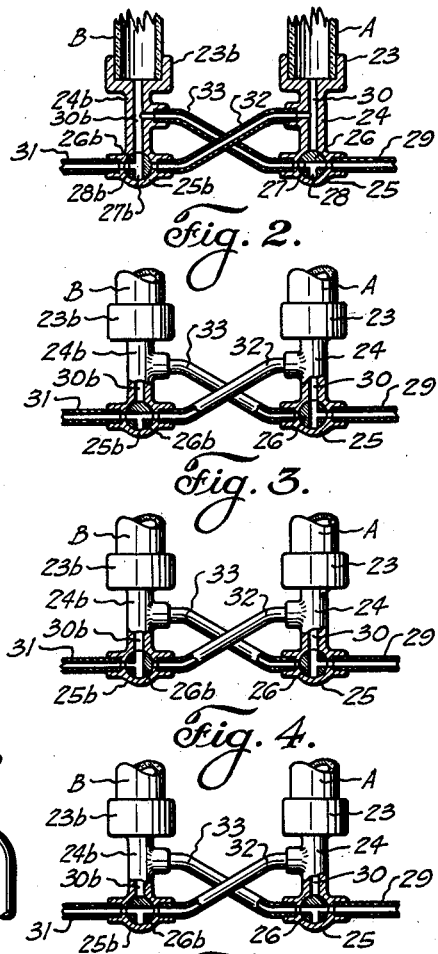
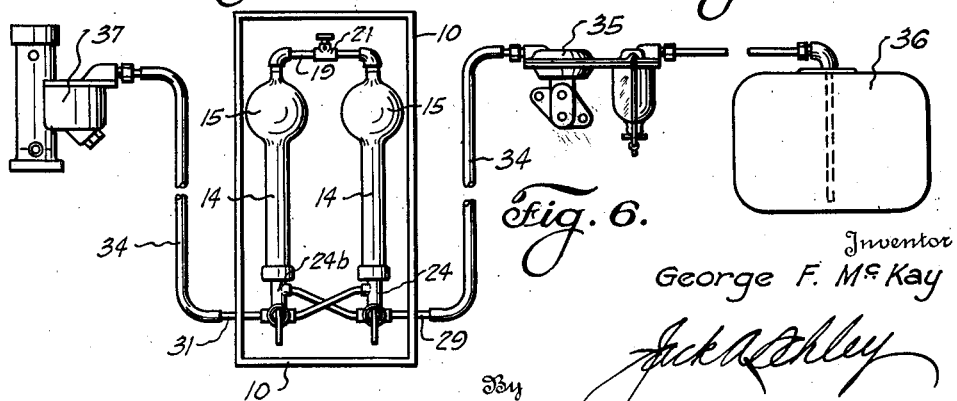
Inventor
George F. McKay Patented Jan. 27, 1942

2,271,144

UNITED STATES PATENT OFFICE 2,271,144

FUEL TESTING MEASURING APPARATUS

George F. McKay, Brownwood, Tex.

Application March 25, 1940, Serial No. 325,665

13 Claims. (Cl. 73—51)

This invention relates to new and useful improvements in fuel testing measuring apparatus.

One object of the invention is to provide an improved apparatus for accurately measuring and indicating the fuel flowing through a line, the device being particularly adapted for determining the fuel consumption of internal combustion engines or motors under various loads, speeds, and other conditions.

An important object of the invention is to provide an improved fuel testing apparatus which is particularly adapted for use with the engine of a motor vehicle, although it may be employed on industrial engines and other motors, and which is arranged to be connected in the fuel line between the fuel pump and the carburetor so that the fuel from the testing apparatus is delivered to the engine under normal pump pressures, whereby the test is made under the normal engine operating conditions, which assures an accurate test as to fuel consumption.

Another object of the invention is to provide an improved fuel testing apparatus which is connected with the usual fuel line of the engine and which is so constructed that the fuel may be either directed through the apparatus to make a test or by-passed around said apparatus when the latter is not in use; the control of the fuel flow being possible without stopping the engine, whereby substantially continuous testing may be accomplished to facilitate tests of the fuel consumption under various speeds, loads and conditions in a minimum amount of time.

A particular object of the invention is to provide an improved testing apparatus, of the character described, wherein a pair of receptacles are adapted to receive the fuel which is supplied to the engine for testing purposes, said receptacles being interconnected in such manner that when the fuel is flowing from one receptacle to the engine, a pressure is maintained on the other receptacle and such pressure acts on the fuel escaping from the first mentioned receptacle, whereby said fuel is delivered to the engine under pressure and gravity is not depended upon for such delivery; the arrangement of the two receptacles also permitting the same to be used alternately for successive tests, whereby a plurality of tests may be made in a minimum length of time.

Still another object of the invention is to provide a fuel tester, of the character described, wherein the two fuel receptacles are connected to the fuel pump and carburetor of the engine and wherein an improved valve control is employed, whereby one of said receptacles may be filled while the other is being emptied, such filling also serving to maintain a pressure on the fuel escaping from the other receptacle.

A further object of the invention is to provide an improved apparatus, of the character described, which is simple and compact in construction, which may be readily and quickly attached to any internal combustion engine and which provides a visual indication of the fuel consumption, the visible indicator being in full view during the entire test.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a front elevation of a fuel testing apparatus, constructed in accordance with the invention, Figure 2 is a transverse, vertical, sectional view of the lower portion of the test tubes and their connections, and illustrating the control valves in one position, Figures 3 to 5 are similar views, showing the various positions of the control valves during the operation of the apparatus, and Figure 6 is an elevation of the apparatus connected in the fuel line of an internal, combustion engine.

In the drawing, the numeral 10 designates a casing or housing which is illustrated as substantially rectangular in shape. The front of the housing is open and a pair of horizontal supporting bars 11 extend transversely within the interior of the housing and are disposed at the upper and lower portions thereof. A pair of test tubes A and B are mounted within the housing 10 on the brackets 11, being secured to said brackets or bars by means of clips 12 which are fastened to the bars by screws 13. The tubes A and B are constructed in exactly the same manner and each is made of glass, or other transparent material. Each tube is formed with an elongated cylindrical portion 14 and the upper portion of the tube is enlarged to provide a globe or ball-shaped portion 15. The extreme upper end 16 of each tube is preferably reduced, as is clearly shown in Figure 1. By forming the ball or globe 15 in the upper portion of each tube, the length of the tube may be reduced and manifestly, the invention is not to be limited to the particular shape illustrated, as it would be possible to elongate the tube so that the same may have the desired capacity. Each tube has a plurality of graduations 17 thereon and these graduations are suitably numbered and as shown, indicate fractions of a gallon, as will be explained. At the extreme upper portion above the ball 15, each tube is provided with an indicating line 18.

The upper ends of the tubes are connected to each other by a pipe or line 19, which line has its ends secured to elbows 20 which are suitably fastened to the upper end of the tubes A and B. Connected in the pipe or line 19 is a vent valve or bleeder 21 and this valve is provided with a manual control screw 22, whereby the air from within the tube may be vented to atmosphere.

The lower end of the tube A is closed by a collar 23 which is cemented or otherwise secured thereto. A depending nipple 24 is preferably made integral with the collar 23 and has a valve body 25 made integral with its lower end. A rotatable valve element 26 is mounted within the valve body 25 and is formed with a diametrically extending passage 27, as well as with a lateral port 28, which extends outwardly from the central portion of the passage 27. The rotatable valve element provides a three-way valve. An inlet pipe 29 is connected in the valve body 25 and is arranged to conduct fuel thereinto. As will be explained, the position of the valve element 26 controls the flow from this line 29, either through the valve, or upwardly into the bore 30 of the nipple 24. As is clearly shown in Figure 2, the nipple communicates with the lower end of the tube A.

The tube B has its lower end connected to a collar 23b, which is similar in construction to the collar 23 mounted on the lower end of the tube A. The collar 23b has a depending nipple 24b and a valve housing 25b. Within the housing, a valve element 26b, which is constructed in exactly the same manner as the valve element 26, is mounted. The valve element 26b has a diametrically extending passage 27b and the radial port 28b. An outlet line 31 extends from the valve housing 25b and the valve element 26b controls the flow into this line, as will be explained. The bore 30b of the nipple 24b communicates with the lower end of the tube B.

For interconnecting the lower ends of the tubes A and B, a pair of crossed pipes 32 and 33 are provided. The pipe 32 has one end connected in the nipple 24 and communicates with the bore 30 thereof, while its other end is connected to the valve body 25b which is disposed below the tube B. Similarly, the pipe 33 has one end connected to the nipple 24b and communicates with the bore 30b thereof, while its other end is connected to the valve body 25 below the tube A. Manifestly, the position of the three-way valves 26 and 26b will control the flow from the inlet line 29 to the outlet line 31 through the nipple 24 and 24b, as well as through the crossed pipes 32 and 33.

The apparatus is adapted to be connected in the usual flue fuel line 34 of an internal combustion engine, as is clearly shown in Figure 6. The inlet pipe 29 which extends outwardly through one wall of the casing 10 has connection with the line 34 which leads from the usual fuel pump 35. Of course, the pump is supplied from a tank 36, or other source. The outlet line 31 which extends from the valve body 25b and through the wall of the casing 10 has connection with the fuel line which leads to the carburetor 37 of the engine (not shown). Of course, the device may be mounted at any desired point either adjacent the engine or if testing the engine of a motor vehicle, within the interior of said vehicle. Since the front of the casing 10 is open, the two tubes A and B are clearly visible at all times.

In the operation of the device, it will be assumed that the same is connected in the fuel line of the engine of a motor vehicle and that it is desired to test the fuel consumption of said engine under various engine speeds and loads. In such instance, the valves 26 and 26b are in the position shown in Figure 2 and at this time, the air vent valve 22 is closed. In such position of the valve, the flow of fuel is from the pump 35, through the line 34 and into the inlet pipe 29. This fuel flows through the passage 27 of the valve 26, then through the pipe 33, nipple 24b, through the valve element 26b and finally out through the outlet 31 into the carburetor 37 of the engine. At this time, the position of the valve 26 has shut off communication between the lower end of the tube A and the inlet line 29 as well as communication between the lower end of said tube and the outlet line, the latter being accomplished because of the position of the valve 26b. However, there is a communication between the lower end of the other tube B and the outlet line 31. At this time, the fuel is being supplied directly from the pump 35 to the carburetor 37. However, the communication between the tube B and the fuel line at this time, causes some fuel to rise upwardly in the tube B because the carburetor will not use all of the fuel which is supplied by the pump 35.

A portion of the fuel will continue to rise upwardly in the tube B until the air in the upper end of said tube and the air within the other tube A is compressed to a predetermined pressure, which is equal to the pump pressure. When this balance is reached, any further rise of the fuel in the tube B is prevented and the engine will have continued to operate in a normal manner and under the normal pump pressure.

When it is desired to make a test, which of course will be made over a measured distance, such as for example, a mile, the air vent valve 22 is opened to vent a portion of the air from the tubes A and B. The venting of this air will permit the liquid fuel to rise upwardly in the tube B and when said fuel reaches the indicating line 18, the valve 22 is closed, whereby further rise of the fuel is halted. The valves 26 and 26b are then turned to the positions shown in Figure 3, whereby the fuel is trapped within the tube B and fuel is supplied to the carburetor from line 29 and through pipe 32. The device is now ready for the test.

To begin the test, the valve element 26b is rotated so as to move said element back to the position shown in Figure 2, the valve element 26 remaining in the position shown in Figure 3 and such manipulation of the valve 26b shuts off the communication between the carburetor and the nipple 24 and directs the fuel from the pump 35 to the tube A. The delivery of the fuel to the lower end of the tube A forces the fuel upwardly in the tube under the pump pressure and, through the medium of the air trapped between the fuel flowing upwardly in the tube A and the fuel within the tube B, said fuel in the latter tube flows outwardly from the lower end thereof and through the outlet line 31 and fuel line 34 to the carburetor 37. Therefore, the fuel which is operating the engine at this time is supplied solely from the tube B. This fuel from the tube is delivered to the carburetor at substantially the pump pressure because said pressure is applied through the air and fuel within the tube A, as has been explained. Therefore, the fuel consumption test is made under the ordinary or normal operating condition of the engine.

So long as the vehicle is traversing the measured mile or other distance, the fuel is supplied to the engine from the tube B and the fuel is emptied in accordance with the consumption by the engine. When the measured or predetermined distance has been completed, the valve 26b is rotated to the position shown in Figure 3, whereby the valves 26b and 26 are in the positions shown in this figure. Such manipulation of the valve 26b closes the communication between the tube B and the outlet line 31, whereby the fuel remaining in the tube B which was unused during the test, is trapped therein. At the same time, the valve 26b permits a flow of the fuel from the nipple 24 and through the pipe 32 to the outlet line 31 and then to the carburetor 37, whereby said carburetor is again supplied with fuel directly from the pump 35. Obviously, during the test, the fuel has been emptied from the tube B to a predetermined point and by noting the level of the trapped fuel within said tube, it is possible to determine how much fuel has been consumed over the measured distance. As illustrated, the graduations of the tube B are representative of fractions of a gallon and thus the point at which the fuel level is halted upon the operation of the valve 26b, is indicative of the amount of fuel consumed. For example, if the level of the fuel in the tube B after the test is at the numeral or line 16, this indicates that $\frac{1}{16}$ of a gallon of fuel was required to run the measured distance, thereby indicating that the fuel consumption is 16 miles per gallon. Of course, the graduations may be representative of any amount and the invention is not to be limited to those illustrated.

As the liquid level dropped within the tube B during the actual test, the liquid level within the tube A rises in accordance with the amount of fuel emptied from the tube B and therefore when the valve 26b is manipulated at the end of the test, the level within the tube A is at some point between the extremities of the tube. If all of the fuel was used from the tube B, then the liquid in the tube A would stand approximately at the indicating line 18 on said tube. Obviously, if a less amount of fuel was used from the tube B, then the level in the tube A would be lower than the mark 18. As soon as the valve 26b was manipulated at the end of the test, the fuel from the pump 35 was supplied through the valve 26, nipple 24, pipe 32, valve 26b and through the line 31 to the carburetor 37. Since air is trapped between the liquid levels in the two tubes, a further rise of the liquid in the tube A would not be possible.

In order to bring the level in the tube A up to the indicating mark 18 so that this tube will be made ready for the next test, the valve 26b is again returned to its original position, whereby the valves 26b and 26 assume the position shown in Figure 4. In such position, the fuel from the lower end of the tube B is supplied to the carburetor and the fuel pump pressure is supplied to the lower end of the tube A. This causes a rise in the level of the liquid within the tube A, which is permitted by a lowering of the level in the tube B. As soon as the level in the tube A rises to the indicating line 18, the valve 26 is rotated to the position shown in Figure 2, whereby the lower end of the tube A is closed and fuel is supplied from the pump directly to the carburetor through the valve 26, line 33, nipple 24b, valve 26b and the line 31. Thus, the engine is operating from fuel supplied directly from the pump and the fuel within the tube A is trapped ready for the next test.

When the next test is made, the valve 26b is moved to the position shown in Figure 5 and at this time, the valves 26b and 26 are in the position shown in this figure. Such position of the valves, cuts off a flow to the tube A and also shuts off a flow from the pump to the carburetor. The fuel is supplied to the engine from the tube A, flowing outwardly from the lower end thereof, through the pipe 32, valve 26b and the lines 31 and 34 to the carburetor. As the level in the tube A moves downwardly, the pump serves to force fuel upwardly in the tube B in substantially the same manner as it forced fuel upwardly in the tube A while the engine was operating from fuel supplied from the tube B. Therefore, as the test is being made, the fuel is supplied solely from the tube A and the liquid level in the tube B is rising in accordance with the fall of the liquid level in the tube A. When the measured distance has been traversed, the valve 26b is actuated and is moved to the position shown in Figures 2 and 4, whereby the flow of fuel is directed from the pump 35, through the pipe 33 and then to the carburetor. Such manipulation of the valve 26b also shuts off the flow of fuel from the tube A, whereby the operator may note the level at which the fuel is disposed within the tube A. Such level is of course indicative of the amount of fuel consumed during the test.

It will be noted that at this time, after the completion of the test from the tube A, the valves 26 and 26b have again been disposed in the position shown in Figure 2. Of course, while the liquid was flowing from the tube A, a liquid level was being built up to a certain point in the tube B. Thus, in order to make ready for the next test, the valve 26b is manipulated and moved to the position shown in Figure 5, whereby the remainder or any portion thereof of the fuel in the tube A may be drained therefrom in order to permit the level in the tube B to be built up to the indicating mark 18 so as to make the tube B ready for the next succeeding test. As soon as the level in the tube B has built up to this mark, the valves 26 and 26b are moved to the position shown in Figure 3 to trap the fuel in the tube B and to supply fuel directly from the fuel pump 35 to the carburetor 37. The parts remain in this position until the next test begins, at which time the valve 26b is manipulated in the manner hereinbefore described to make the next test from the tube B.

From the foregoing, it will be seen that the two tubes A and B are alternately used in making the test and the fuel may be delivered to said tubes without stopping the operation of the vehicle. This makes it possible to continuously make tests at various speeds and to get an accurate log of the fuel consumption of the vehicle under various speeds, as well as under varying loads and conditions. Obviously, in place of the two valves 26 and 26b, it would be possible to employ only a single valve which would be arranged at the intersection of the various connecting pipes so as to control the flow in the manner above described. An important feature of the invention is the arrangement, whereby the fuel pressure may be placed upon the upper end of the liquid in the tube which is suppling fuel to the carburetor, whereby gravity is not depended upon to deliver the fuel to the carburetor during the test. This permits the test to be made under actual pump pressure and other normal operating conditions and assures that an accurate test as to fuel consumption is obtained. Since the tubes are preferably constructed of a transparent material, the operator may immediately note the level of the fuel within each tube at the completion of the test and may immediately determine the fuel consumption.

It is pointed out that the bores 30 and 30b of the nipples 24 and 24b are sufficiently large to permit any air bubbles which might be present in the fuel flowing from the pump to the carburetor to escape upwardly into the tubes A and B, whereby the fuel is delivered to the carburetor without such air bubbles. Although the device has been shown as applied to an internal combustion engine, it is obvious that it may be employed as a flow meter for measuring the rate of flow of any fluid in gallons per hour.

The foregoing description of the invention is explanatory thereof and various changes in the size, shape and materials as well as in the details of the illustrated construction may be made, within the scope of the appended claims, without departing from the spirit of the invention.

What I claim and desire to secure by Letters Patent is:

1. An apparatus for measuring the flow of fuel which is pumped through a fuel line including, a receptacle adapted to be connected in the fuel line of the engine between the pump and point of consumption, valve means associated with the receptacles and fuel line and arranged to control the flow of fuel from the line to the receptacle to fill said receptacle and also arranged to shut off flow through the fuel line and permit flow from the receptacle to the point of consumption for measuring purposes, and means for applying the pump pressure to the upper end of the receptacle above the fuel level therein during the entire time that fuel from said receptacle is flowing to the point of consumption whereby the fuel is ejected from the receptacle under the pump pressure.

2. A fuel testing apparatus for internal combustion engines including, an elongate tube adapted to be connected in the fuel line of the engine so that its lower end communicates with said line, and valve means associated with the lower end of the tube and the line arranged to establish direct communication between the fuel line and engine, establish communication between the fuel line and tube and at the same time establish communication between the fuel line and engine, whereby said engine may be normally operated, while fuel is being introduced into the tube, said valve means further being adapted to establish communication between the tube and engine so as to supply fuel solely from the tube for test purposes, and means for applying the pump pressure to the upper end of the tube above the liquid level when the valve means is in a position establishing flow from the tube to the engine, whereby the fuel from the tube is delivered to the engine under pressure.

3. A testing apparatus for testing the fuel consumption of a vehicle including, an elongate tube, means for connecting the lower end of the tube in the fuel line of the engine between the fuel pump and the carburetor of the engine, a valve connected in the fuel line beyond the lower end of the tube for controlling the flow therethrough, the open position of said valve allowing a direct flow through the fuel line from the pump to the carburetor and also permitting fuel to flow into the lower end of the tube, means for venting air from the upper end of the tube to permit the fuel to rise in the tube to a predetermined level, and means in the fuel line between the pump and tube for shutting off the flow through the fuel line, whereby the fuel is supplied to the engine solely from the tube.

4. A testing apparatus for testing the fuel consumption of a vehicle including, an elongate tube, means for connecting the lower end of the tube in the fuel line of the engine between the fuel pump and the carburetor of the engine, a valve connected in the fuel line beyond the lower end of the tube for controlling the flow therethrough, the open position of said valve allowing a direct flow through the fuel line from the pump to the carburetor and also permitting fuel to flow into the lower end of the tube, means for venting air from the upper end of the tube to permit the fuel to rise in the tube to a predetermined level, means in the fuel line between the pump and tube for shutting off the flow through the fuel line, whereby the fuel is supplied to the engine solely from the tube, and means for establishing a communication between the fuel line and upper end of the tube to apply the pump pressure above the fuel in said tube, whereby the fuel from the tube is delivered to the carburetor under pressure.

5. A testing apparatus for testing the fuel consumption of a vehicle including, an elongate tube, means for connecting the lower end of the tube in the fuel line of the engine between the fuel pump and the carburetor of the engine, a valve connected in the fuel line beyond the lower end of the tube for controlling the flow therethrough, the open position of said valve allowing a direct flow through the fuel line from the pump to the carburetor and also permiting fuel to flow into the lower end of the tube, means for venting air from the upper end of the tube to permit the fuel to rise in the tube to a predetermined level, a connection between the upper end of the tube and the fuel line, said connection being attached to the line between the tube and the fuel pump, and valve means for shutting off the flow of fuel from the pump to the lower end of the tube and for directing the pump pressure through the connection to the upper end of the tube, whereby the fuel is forced from the lower end of the tube to the carburetor under pressure.

6. An apparatus for testing the fuel consumption of an internal combustion engine including, a pair of elongate tubes for receiving fuel, and having their upper ends in communication with each other, interconnecting conduits connecting the lower ends of said tubes, means for connecting the apparatus in the fuel line of the engine between the fuel pump and carburetor thereof, whereby fuel may flow through the conduits and into the tubes, and valve means associated with the conduits and tubes, for controlling the flow therethrough and also through the fuel line.

7. An apparatus for testing the fuel consumption of an internal combustion engine including, a pair of elongate tubes for receiving fuel, and having their upper ends in communication with each other, interconnecting conduits connecting the lower ends of said tubes, means for connecting the apparatus in the fuel line of the engine between the fuel pump and carburetor thereof, whereby fuel may flow through the conduits and into the tubes, and valve means associated with the conduits and tubes, for controlling the flow therethrough and also through the fuel line, the valve arrangement permitting each tube to be alternately employed for test purposes and being arranged to direct the pump pressure into one tube while the other tube is supplying fuel to the carburetor, whereby such pump pressure acting through the tube acts on the top of the fuel in the other tube to deliver the fuel from the latter to the carburetor under pressure.

8. An apparatus for testing the fuel consumption of an internal combustion engine including, a pair of elongate tubes for receiving fuel, and having their upper ends in communication with each other, interconnecting conduits connecting the lower ends of said tubes, means for connecting the apparatus in the fuel line of the engine between the fuel pump and carburetor thereof, whereby fuel may flow through the conduits and into the tubes, valve means associated with the conduits and tubes for controlling the flow therethrough and also through the fuel line, and additional valve means for alternately employing each tube for test purposes and for utilizing the inactive tube as a conductor for conducting the pressure of the pump to the top of the other tube whereby the fuel is forced from the latter under pressure.

9. An apparatus for testing the fuel consumption of a fuel consuming device including, a pair of containers for receiving fuel and having their upper ends in communication with each other, conduits for connecting the lower ends of the containers to establish communication between the lower ends of the containers, a fuel supply line connected to the conduits, a fuel outlet line leading from the conduits to the device, and valve means associated with the conduits and arranged to be moved to a plurality of positions, whereby fuel may be conducted from the supply line to either one of the containers individually and at the same time to the fuel outlet line, and from either one of the containers to the fuel outlet line, this latter position also permitting communication between the other container and the fuel supply line.

10. An apparatus for testing the fuel consumption of a fuel consuming device including, a pair of containers for receiving fuel and having their upper ends in communication with each other, conduits for connecting the lower ends of the containers to establish communication between the lower ends of the containers, means for connecting the conduits to the usual fuel supply line of the fuel consuming device whereby fuel under pressure is directed to the conduits, a fuel outlet line leading from the conduits to the device for supplying fuel thereto, and valve means associated with the conduits for controlling the flow of fuel through the conduits and to the containers and fuel supply, said valve means being movable to various positions to direct fuel simultaneously to one of the containers, and to the outlet line, or to direct fuel simultaneously from the fuel supply line to one of the containers and from the other container to the fuel outlet line, whereby each container may be readily employed for test purposes and may be emptied by the pressure applied through the other container and also whereby the containers may be filled without halting the operation of the engine.

11. A fuel measuring apparatus including, a receptacle for receiving fuel, a conduit leading from the lower end of the receptacle, means for connecting said conduit to a fuel supply line having fuel under pressure therein, an outlet line extending from the conduit, means for establishing communication between the fuel supply line and the upper end of the receptacle whereby pressure may be conducted to the upper end of the receptacle, and valve means for controlling the flow of fuel through the conduit to the receptacle and also for controlling the application of pressure to the upper end of the receptacle, said valve means being movable to various positions, one position of said means permitting a simultaneous flow of fuel to the lower end of the receptacle and to the fuel outlet line while preventing the application of pressure to the upper end of the receptacle, and another position of said means allowing a flow of fuel to the outlet line while permitting the application of pressure to the upper end of the receptacle.

12. A fuel measuring apparatus including, a receptacle for receiving fuel, a conduit leading from the lower end of the receptacle, means for connecting said conduit to a fuel supply line having fuel under pressure therein, an outlet line extending from the conduit, means for establishing communication between the fuel supply line and the upper end of the receptacle whereby pressure may be conducted to the upper end of the receptacle, and manually operated valve means mounted in the conduit for controlling the flow of fuel through the conduit to the receptacle and also for controlling the application of pressure to the upper end of the receptacle, said valve means being movable to various positions, one position of said means permitting a simultaneous flow of fuel to the lower end of the receptacle and to the fuel outlet line while preventing the application of pressure to the upper end of the receptacle, and another position of said means allowing a flow of fuel to the outlet line while permitting the application of pressure to the upper end of the receptacle.

13. A fuel measuring apparatus including, a receptacle for receiving fuel, a conduit leading from the lower end of the receptacle, means for connecting said conduit to a fuel supply line having fuel under pressure therein, an outlet line extending from the conduit, a conductor extending from the fuel supply line to the upper end of the receptacle, a valve mounted in the conduit for controlling the flow therethrough, said valve being movable to various positions, one position simultaneously directing fuel from the fuel supply line to the receptacle and to the fuel outlet line and another position shutting off flow from the fuel supply line and directing flow from the receptacle to the outlet line, and a second valve in the conductor for controlling the application of pressure to the upper end of the receptacle, said valve shutting off the pressure when the first valve is in a position admitting fuel to the lower end of the receptacle and admitting pressure when said first valve is allowing flow from the receptacle to the outlet line.

GEORGE F. McKAY.